US012682026B2

(12) United States Patent
Gu et al.

(10) Patent No.: US 12,682,026 B2
(45) Date of Patent: Jul. 14, 2026

(54) MULTIDIMENSIONAL LOCAL LARGE LANGUAGE MODEL USER AUTHENTICATION

(71) Applicant: Gen Digital Inc., Tempe, AZ (US)

(72) Inventors: Lei Gu, Bedford, MA (US); Iskander Sanchez, Antibes (FR); Kevin Roundy, El Segundo, CA (US)

(73) Assignee: Gen Digital Inc., Tempe, AZ (US)

( * ) Notice: Subject to any disclaimer, the term of this patent is extended or adjusted under 35 U.S.C. 154(b) by 134 days.

(21) Appl. No.: 18/431,560

(22) Filed: Feb. 2, 2024

(65) Prior Publication Data

US 2025/0252164 A1 Aug. 7, 2025

(51) Int. Cl.
*G06F 21/31* (2013.01)

(52) U.S. Cl.
CPC .................................... *G06F 21/31* (2013.01)

(58) Field of Classification Search
CPC .......... G06F 21/31; G06F 21/36; G06F 21/32; G06F 21/316; G06F 21/46; G06F 2221/2103
See application file for complete search history.

(56) References Cited

U.S. PATENT DOCUMENTS 9,633,322 B1 * 4/2017 Burger ............... G06Q 20/4014
10,200,364 B1 * 2/2019 Ketharaju ........... H04L 63/0853
2007/0078668 A1 * 4/2007 Pathria ................... G06Q 90/00 705/325
2013/0174240 A1 * 7/2013 Bidare .................. H04L 9/3271 726/7
2015/0143461 A1 * 5/2015 Uetabira ................. H04L 63/08 726/3
2016/0292686 A1 * 10/2016 Laxminarayanan ......................... G06Q 20/385
2017/0330079 A1 * 11/2017 Akolkar ................. G06N 5/022
2019/0141033 A1 * 5/2019 Kaafar ..................... G06F 21/36
2020/0065459 A1 * 2/2020 Himabindu ........... G06F 21/316
2020/0257788 A1 * 8/2020 Bhattacharyya ........ G06F 21/31
2022/0284194 A1 * 9/2022 Galitsky ................. G06F 40/35
2023/0004973 A1 * 1/2023 Edwards ............ G06Q 20/4014
2023/0198999 A1 * 6/2023 Praszczalek .......... H04L 63/083 726/7
2024/0086501 A1 * 3/2024 Osborn ................... G06F 21/31
(Continued)

OTHER PUBLICATIONS

L. Li and B. Gong, "Prompting Large Language Models for Malicious Webpage Detection," 2023 IEEE 4th International Conference on Pattern Recognition and Machine Learning (PRML), Urumqi, China, 2023, pp. 393-400. (Year: 2023).*
(Continued)

*Primary Examiner* — Kari L Schmidt
(74) *Attorney, Agent, or Firm* — AVEK IP, LLC; Mark C. Young

(57) ABSTRACT

A computer user is authenticated by collecting user data from at least two dimensions of user activity into a local large language model (LLM) residing on a user device, and generating user authentication questions from at least those two dimensions of user activity using the large language model. Questions having intersecting time or location are discarded, and questions from two or more dimensions are presented to the user for response. The user is authenticated by comparing the user response to known correct answers to the questions.

20 Claims, 4 Drawing Sheets

(56) References Cited

U.S. PATENT DOCUMENTS

| | | | | |
|---|---|---|---|---|
| 2024/0146734 | A1* | 5/2024 | Southgate | G06F 21/6227 |
| 2024/0362497 | A1* | 10/2024 | Grenader | G06N 3/0455 |
| 2024/0364730 | A1* | 10/2024 | Jones | H04L 63/083 |
| 2025/0021967 | A1* | 1/2025 | Ferenczi | G06Q 20/382 |
| 2025/0071108 | A1* | 2/2025 | Maddukuri | H04L 63/08 |
| 2025/0077696 | A1* | 3/2025 | Marlin | G06N 3/0475 |
| 2025/0112907 | A1* | 4/2025 | McGuinness | H04L 63/0807 |
| 2025/0182208 | A1* | 6/2025 | Sanders | G06Q 40/06 |
| 2025/0209261 | A1* | 6/2025 | Carbune | G06F 40/20 |
| 2025/0245685 | A1* | 7/2025 | Ho | G06Q 30/0203 |
| 2025/0371178 | A1* | 12/2025 | Gu | G06F 21/62 |
| 2025/0390602 | A1* | 12/2025 | Tran | G06F 21/6245 |

OTHER PUBLICATIONS

T. -H. -G. Vu and X. -B. Hoang, "User Privacy Risk Analysis within Website Privacy Policies," 2024 International Conference on Multimedia Analysis and Pattern Recognition (MAPR), Da Nang, Vietnam, 2024, pp. 1-6. (Year: 2024).*

T. Su, B. Zhang, C. Zhang and L. Wei, "Privacy Leak Detection in LLM Interactions with a User-Centric Approach, " 2024 IEEE 23rd International Conference on Trust, Security and Privacy in Computing and Communications (TrustCom), Sanya, China, 2024, pp. 1647-1652. (Year: 2024).*

* cited by examiner

200

MULTIDIMENSIONAL USER DATA

| | | |
|---|---|---|
| 10:10AM | LEAVE HOME | GPS |
| 10:11AM | PLAY CLASSIC ROCK | SPOTIFY |
| 10:20AM | STOP AT RED LIGHT | GPS |
| 10:35AM | STOP AT GAS STATION | GPS |
| 10:45AM | ARRIVE AT GYM | GPS |
| 11:45AM | TAKE PICTURE OF PHYSIQUE | PHOTO |
| 12:00PM | LEAVE GYM | GPS |
| 12:01PM | PLAY CLASSIC ROCK | SPOTIFY |
| 12:05PM | ARRIVE AT GROCERY STORE | GPS |
| 12:10PM | PURCHASE TACO SHELLS, $3.79 | APPLE PAY |
| 12:12PM | LEAVE GROCERY STORE | GPS |
| 12:13PM | PLAY XMAS MUSIC | SPOTIFY |
| 12:20PM | ARRIVE AT HOME | GPS |

COLLECT USER DATA FROM A PLURALITY OF DIMENSIONS OF USER ACTIVITY — 302

GENERATE A PLURALITY OF USER AUTHENTICATION QUESTION FROM TWO OR MORE DIMENSIONS OF USER ACTIVITY USING A LARGE LANGUAGE MODEL — 304

DISCARD QUESTIONS HAVING INTERSECTING DIMENSIONALITY — 306

PRESENT TWO OR MORE NON-INTERSECTING USER AUTHENTICAITON QUESTIONS FROM TWO OR MORE DIFFERENT DIMENSIONS TO USER — 308

RECEIVE ANSWERS TO QUESTIONS FROM USER — 310

COMPARE USER-PROVIDED ANSWERS TO KNOWN CORRECT ANSWERS TO AUTHENTICATE USER — 312

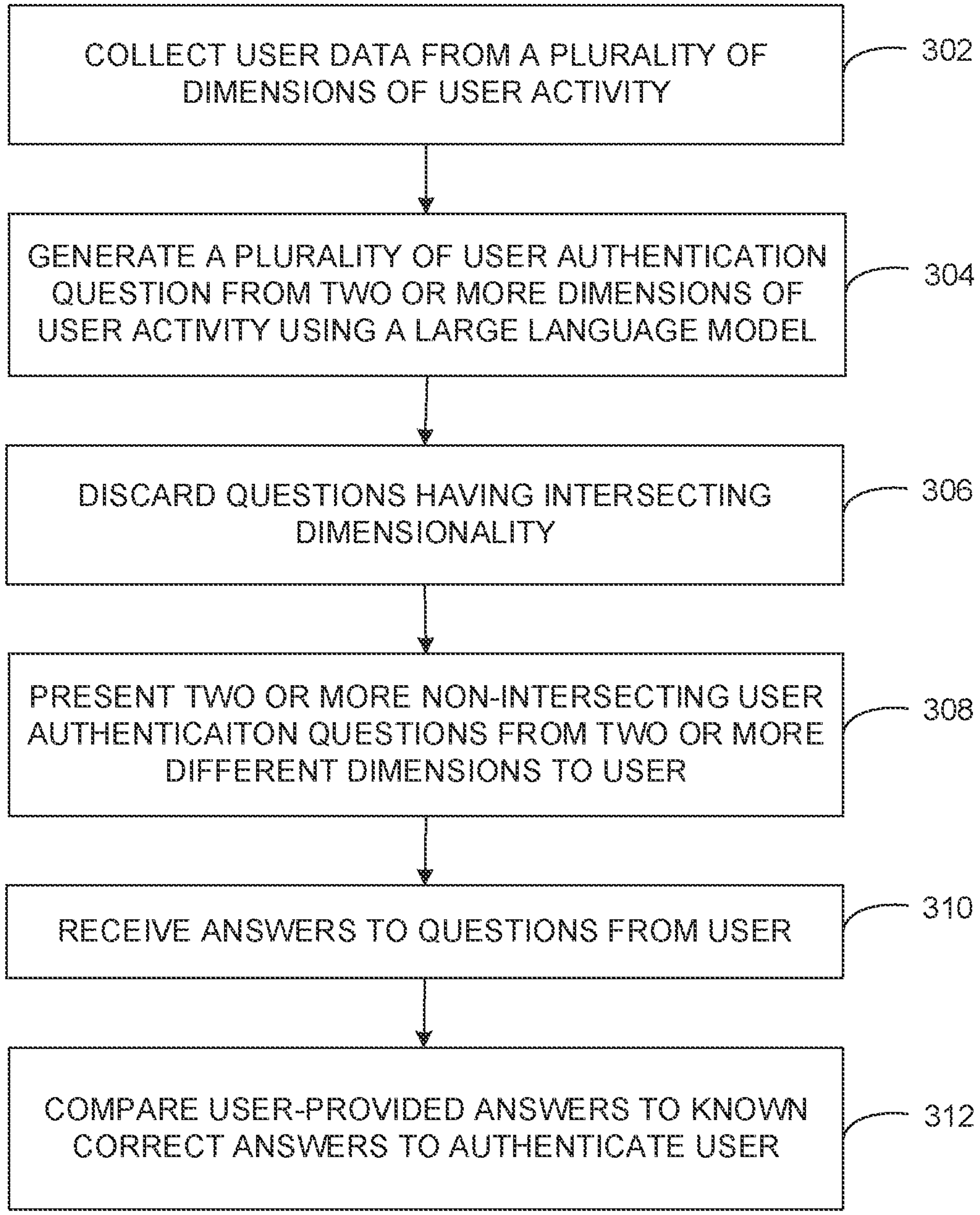

FIG. 3

MULTIDIMENSIONAL LOCAL LARGE LANGUAGE MODEL USER AUTHENTICATION

FIELD

The field relates generally to user authentication in a computerized device, and more specifically to multidimensional local large language model user authentication.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing passwords or other information from a computer or using the computer for unintended purposes. Similarly, web site scanning tools are used to verify the security and integrity of a website, and to identify and fix potential vulnerabilities.

Passwords are particularly valuable to many hackers, as they can provide access to banking accounts, online shopping, and other online services that can be converted to monetary value relatively quickly. Password breaches are frequent problems among website providers, and many "best practices" such as only storing encrypted versions of passwords on servers, using different passwords for each site, and using complex passwords that are long and involve a combination of numbers and letters are often suggested or required. But, use of long, complex, and unique passwords for many different web services makes it difficult to remember each password, and almost necessitates storing the passwords someplace secure, such as a password manager. Because passwords are often prone to being copied, intercepted, or lost, use of a second factor of authentication (2FA) is often desirable to improve the security of online systems or services. But, adding a second layer of security typically involves carrying an extra physical device such as a one-time password token or app, using a device such as a smartphone to receive a text message with a one-time password, using a device to capture biometric data such as a camera or a fingerprint reader, or the like that may add additional complexity and required hardware to the authentication process.

For reasons such as these, a need exists for improved identity verification such as two-factor authentication in computerized systems.

SUMMARY

One example embodiment comprises a method of authenticating a user of a computerized system by collecting user data from at least two dimensions of user activity and generating user authentication questions from at least those two dimensions of user activity using a local large language model (LLM). Questions having intersecting time or location are discarded, and questions from two or more dimensions are presented to the user for response. The user is authenticated by comparing the user response to known correct answers to the questions. The local LLM is preferably a small, targeted LLM stored on the user's device and directed specifically to acquiring information relating to the user (and to the user's device) and generating questions relating to the gathered information. Because the local LLM is stored on the user's device, the collected information never leaves the user's control, preserving the user's privacy and security.

In one embodiment, the local LLM may periodically generate and send a set of questions and answers to a backend server to allow use of the questions and answers by the backend server if necessary. In that embodiment, it should be understood that only questions and corresponding answers are sent to the backend server, the underlying local LLM and the information therein remains on the user device, under the control of the user.

In a further embodiment, the local large language model comprises a generative pretrained transformer (GPT), a recurrent neural network, another type of neural network, or other large language model. In some embodiments, the dimensions of user activity comprise activities such geographic location, purchase history, social media engagement, calendar events, electronic messaging, app usage, and media history.

The details of one or more examples are set forth in the accompanying drawings and the description below. Other features and advantages will be apparent from the description and drawings, and from the claims.

BRIEF DESCRIPTION OF THE FIGURES

FIG. 3 is a flow diagram of a multidimensional large language model user authentication process, consistent with an example embodiment.

DETAILED DESCRIPTION

Figure 1:
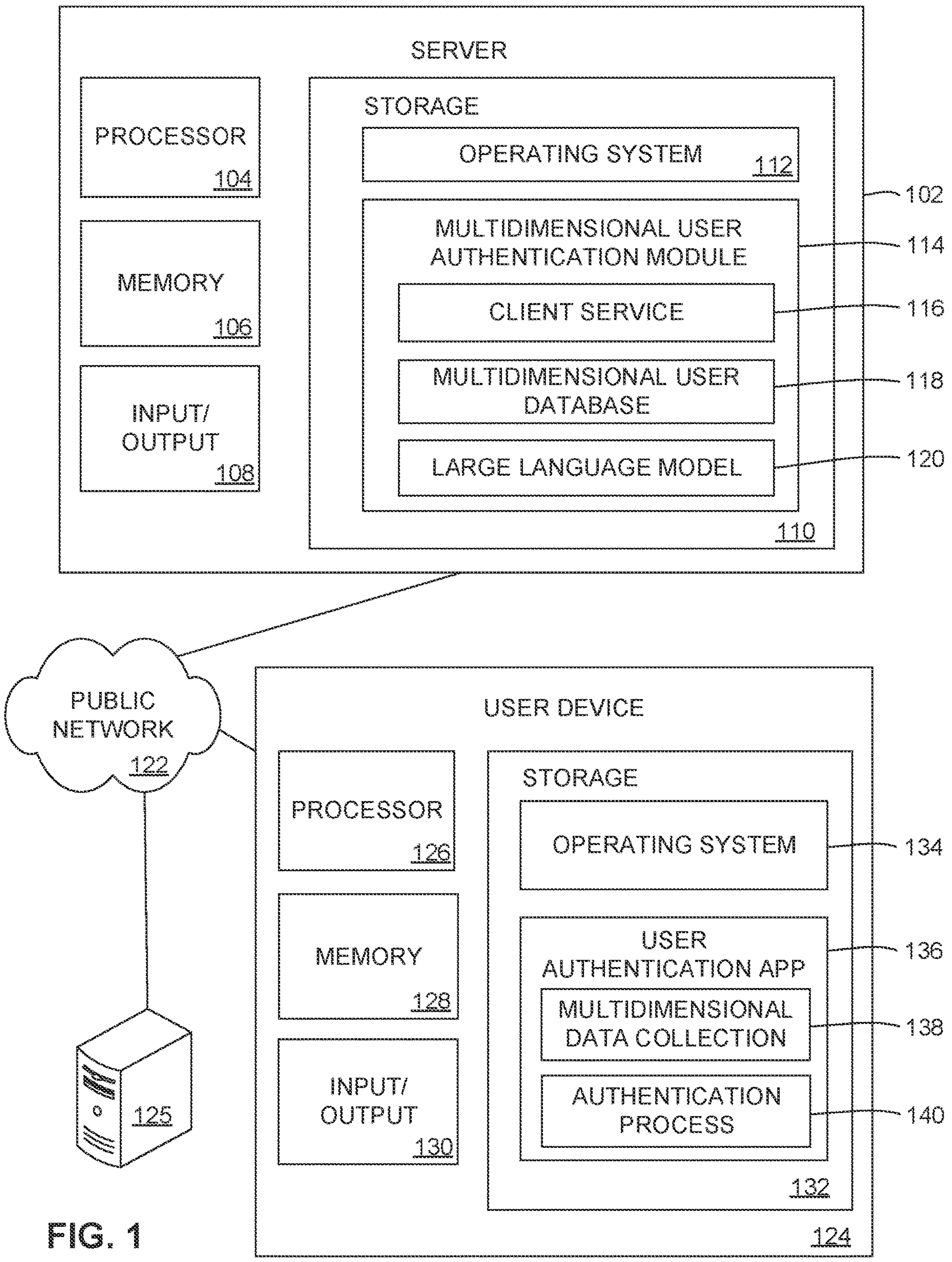
FIG. 1 is a block diagram of a computing environment including multidimensional user authentication via large language model questions, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they convey has grown exponentially. Computers are now used to perform many tasks that were previously performed manually, such as online shopping instead of driving to a store or mall to purchase goods or services, using social media instead of telephone or other means to keep in touch with friends and relatives, and online news sites that continue to replace newspapers and news broadcasts as a source of timely new information. Because many of these networked computer applications involve handling money, personal information, and the like, they typically require setting up user accounts to uniquely and positively identify each user. A user account historically involved a username (that may be publicly shared such as on a social media site) and a secret password that only the user knows, so that by entering the password the user has uniquely and positively identified themselves to a computer system.

Password systems such as these rely on the password being known only to the user, being strong enough not to be guessed or calculated from stored encrypted password data, and being handled in a way that does not subject the password to accidental disclosure. Unfortunately, many users share passwords, write them down, or otherwise handle them in ways that are unsecure. Users are also prone to using predictable passwords such as words, meaningful calendar dates, and the like, making guessing passwords a practical method of attacking the security of a user's account. Similarly, passwords that are too short can be decoded from encrypted or hashed password files stored on networked computer systems' servers, such as by randomly or sequentially guessing passwords for a given user and checking them against the stored hashed version of the password to determine if the guess is correct. Still other attacks can leverage known weaknesses in password hashing functions, facilitating faster "brute force" attacks on guessing the stored passwords.

Passwords can also be disclosed inadvertently, such as by entering a password in an environment where it is subject to detection or interception. Reuse of passwords across multiple websites or other networked services provides a further means of attack, such as where a password (or a hashed password that can be decrypted) is inadvertently leaked from one website and can be used on other websites or online systems. Users may also forget their passwords, requiring a mechanism such as password reset that somehow verifies the user's identity as part of the reset. This has historically involved sending an email with a password reset link to the user, but such emails may be intercepted by people other than the user and rely on the security of the user's email account for user verification.

For reasons such as these, some networked computer services employ two-factor authentication, requiring a user to provide a second user-specific factor of identity verification to the networked computer system to perform various functions such as password reset, logging in using a new computer system, or the like. Two-factor authentication can involve sending a text message or email with a random identification number to the user which the user must then enter, proving they have possession and access to the user's phone or email account and are therefore probably the user. In another example, a one-time password token generated by a hardware token or app will be entered instead as a second authentication factor, with the password token generated using an algorithm and clock on a user device in synchronization with the server. Still other methods may require entering other information known only to the user, such as the user's kindergarten teacher, the street name where they grew up, and the like, that are typically provided by the user as part of a user registration or onboarding process.

But, each of these user authentication methods relies upon asking the user to carry a second hardware device like a one-time password token or smartphone, to securely maintain an account such as an email account without possibility of message interception, or to provide additional information as part of user setup such as additional facts likely known only by the user.

Some examples presented herein therefore provide for an automated multidimensional large language model user authentication tool that may generate secure identity verification questions from multi-dimensional user data and activity. In a more detailed example, a computer system authenticates a user's identity by collecting data from two or more dimensions regarding a user, such as by tracking the user's geographic location, purchase history, social media engagement, calendar events, electronic messaging, app usage, and/or media history. Two or more user authentication questions from different dimensions are generated using a large language model such as a neural network or a generative pretrained transformer (GPT), and the questions are presented to a user. The user answers the questions such by providing a text answer or by selecting the correct answer from multiple answer choices, thereby verifying knowledge of the user information in at least two different dimensions of user activity.

The authentication tool in various embodiments may be distributed between an end user device such as a smartphone or personal computer, a remote server, another computing device, or any combination thereof. In one such combination, a smartphone app collects multidimensional user activity information, such as via app permissions, GPS location tracking, and the like, and reports such data to a server that is operable to use a generative pretrained transformer or other large language model to generate multiple choice authentication questions. The authentication questions are provided to the user device for answer selection and verification. In a further example, questions from at least two dimensions that are not intersecting are selected for authentication, such as a question regarding a car trip and another question regarding a purchase not made as part of the car trip.

Authentication methods and systems such as these enable automated generation of effective user authentication or verification questions, while providing improved security against a vulnerable or hacked dimension of user activity. For example, if a malicious user places a GPS tracker on a person's car to gain access to their physical or geographic location, they may be able to answer several questions about their recent movement or locations accurately. Similarly, a malicious user who gains access to someone's credit card records may be able to answer many questions related to the person's recent purchase history. But, by ensuring that questions are asked across multiple dimensions that do not intersect, such as a person's purchase history and their location history unrelated to or not intersecting their purchases, authentication methods and systems such as these can improve the strength and security of authenticating a user where some user information may be hacked or otherwise available to people other than the authenticating user.

FIG. 1 is a block diagram of a computing environment including multidimensional user authentication via large language model questions, consistent with an example embodiment. Here, the server 102 includes a processor 104 operable to execute computer program instructions and a memory 106 operable to store information such as program instructions and other data while server 102 is operating. The server exchanges electronic data, receives input from a user, and performs other such input/output operations with input/output 108. Storage 110 stores program instructions including an operating system 112 that provides an interface between software or programs available for execution and the hardware of the server, and manages other functions such as access to input/output devices. The storage 110 also stores program instructions and other data for multidimensional user authentication module 114, including client service 116, multidimensional user database 118, and large language model module 120. In this example, the computerized device is also coupled via a public network 122 to one or more user devices 124, such as a user's smartphone or other remote client computerized device 125.

The user device 124 in this example includes a processor 126, a memory 128, input/output 130 including various components such as a camera, a Global Positioning System (GPS) receiver, a speaker and a microphone, and other such components as may be found in personal computers, smartphones, and the like. Storage 132 stores an operating system 134 and program information such as user authentication app 136 that in operation may be loaded into memory 128 and executed via processor 126 to perform various functions such as those described herein.

In operation, the server 102 operates a multidimensional user authentication module 114 that performs a variety of functions to facilitate multidimensional user authentication using a large language model, such as to service requests received from user device 124 via client service 116, multidimensional user database 118, and large language model module 120. The user authentication app 136 in this example is operable to collect multidimensional user data via multidimensional data collection module 138, such as geographic location, purchase history, social media engagement, calendar events, electronic messaging, app usage, media history, and other such activity. The user authentication app is further operable in this example to use authentication process 140 to perform user authentication by presenting a user with two or more questions that vary in dimension and do not intersect, such that it is unlikely a single external source such as a credit card provider's records, a hidden GPS tracker, or other such malicious attempt to hack or track the user's activities will provide sufficient information to correctly answer all questions.

In a more detailed example, the multidimensional data collection module provides user data to multidimensional user database 118 in remote server 102, and remote server 102 is operable to use this information along with large language model module 120 to generate multidimensional non-intersecting user authentication questions in response to a valid user authentication request to client service 116. The user device 124, such as a smartphone, may collect multidimensional user data via multidimensional data collection module 138, which in various examples may be granted permission to track user activity across other applications to compile a database of recent user activity. When user authentication is requested, the user authentication app's authentication process 140 makes a request to the server's multidimensional user authentication module 114, which in turn uses the user-provided multidimensional user history from multidimensional user database 118 to generate multidimensional non-intersecting user authentication questions via large language model 120. These questions are then presented to the user via user device 124's authentication process 140, and the user's answers are compared to known correct answers provided as part of the large language model-generated question to authenticate the user.

User answers in some examples may be compared to known correct answers in the user device, such as in the authentication process 140, but in other examples may be performed external to the user device, such as on server 102 via client service 116.

In a preferred embodiment, some or all of the functions performed by server 102 in this example may be performed by the user device in other examples, such as compiling a multidimensional user database and using a large language model to generate multidimensional non-intersecting user authentication questions and their corresponding correct answers. Preferably, the large language model (LLM) is stored on the user device so that the aggregated information comprising the LLM remains under the control of the user, with only the generated questions and answers sent to other devices and/or servers as necessary. Thus, the user device 124 may include all of the functionality of the server 110 with respect to the generation of the LLM as described herein, with the LLM residing on the user device.

In other examples, some of the functions performed on user device 124 in the example of FIG. 1 may be performed in whole or in part by external systems, such as multidimensional collection of user data from third parties and authentication processes executed via a web browser rather than via a dedicated app or process executing on the user device.

The answers to the multidimensional non-intersecting authentication questions are in some examples derived via the large language model module 120, and in further examples one or more "distractors," or incorrect but plausible additional answers are generated such that the correct answer and the distractors can be presented as part of a multiple-choice question. Although the number of questions and number of multiple-choice answers per question may vary in various examples, the user may be required to choose the correct answer to two or more multiple choice questions to authenticate their identity across multiple non-intersecting dimensions of user activity and/or knowledge. In other examples, the question may be presented in a way that provides for other answer formats, such as freeform text entry of a word or phrase that answers the question. Correctness of the answer may be determined in such examples by the presence of keywords in the user-provided answer, relatedness of answer text entered to certain keywords, phrases, or other information determined to be associated with a correct answer, or other such methods.

The large language model 120 in a more detailed example is a generative pre-trained transformer, pre-trained to generate authentication questions and answers from various types of multidimensional user data. In a further example, the large language model is locally trained using the user's available private data, activity, and other such information collected via multidimensional data collection module 138, such as geographic location, purchase history, social media engagement, calendar events, electronic messaging, app usage, media history, and the like. In other examples, other large language models may be used, such as other transformers, recurrent neural networks or other neural networks, or other such technology similarly operable to process language.

Figure 2:
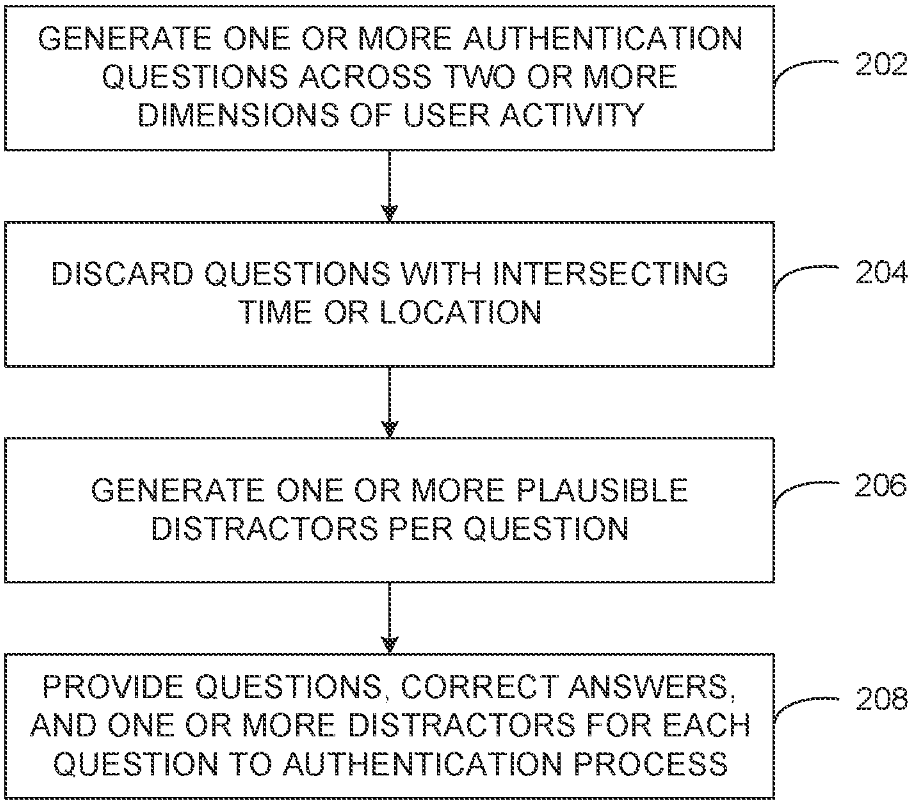
FIG. 2 shows generation of user authentication questions from multiple dimensions of user activity using a large language model, consistent with an example embodiment.

FIG. 2 shows generation of user authentication questions from multiple dimensions of user activity using a large language model, consistent with an example embodiment. At 200, a data set of user activity is shown, such as may be collected by the user's smartphone via a multidimensional data collection module such as that shown at 138 of FIG. 1. On the left, the time of each data observation is shown, while a text description of the nature of the observation is shown in the middle column, which in a further example may comprise part or all of the dimensionality of the data element. On the right, the type of data is shown, which in a further example may comprise part or all of the dimensionality of the data element. In this simplified example, types of user data collected include geographic location such as being at home, the gas station or the gym, movement behavior such as stopping at an intersection with traffic control lights, purchase behavior such as completing a purchase using electronic payment like Apple Pay or a credit card, media use behavior such as listening to a music channel or collection on Spotify, and camera use such as capturing a photo or video.

To generate multidimensional authentication questions from this simplified data set of user activity, an example process shown at 202-208 starts by generating at least one authentication question per stream for at least two of the identified streams or dimensions of user activity at 202. Examples using the multidimensional user activity data set shown at 200 may include "what time did the user leave home?," "what did the user purchase at the grocery store?," and "what music did the user listen to when driving from the grocery store to home?." At 204, these generated questions are evaluated for intersecting characteristics, such as intersecting time or location, so that intersecting questions can be discarded. For example, if the questions "where did the user travel at 12:05?" and "what did the user purchase at the grocery store at 12:05" were both generated, one of them would be discarded as it may be at least partially inferred from knowledge of the other question or the question's answer due to the intersection of both location and time.

When the questions generated at 202 have been filtered to remove intersecting questions at 204, one or more plausible distractor answers per question are generated at 206. For example, if "what did the user purchase at the grocery store at 12:05 PM" is a generated question and the answer is known to be "taco shells," distractor answers may include other plausible grocery store purchases such as milk, pizza, chips, breakfast bars, and the like. In a more complex example, the incorrect distractor answers may be selected based on criteria such as overall probability or likelihood of an answer being correct, random selection based on probability such that distractors do not always contain the few most likely possible elements, and the like. For example, if grocery store distractors usually include only the most common items such as milk, soda, chips, eggs, and bread, it may be easy to distinguish less common items such as hummus or taco shells from the list as being less probable and therefore the correct answer. Random inclusion of less probable answers, such as by random selection based on a probability weighting, may help improve the quality of the distractor questions and reduce the probability that the user might distinguish the correct answer from the distractors without actual knowledge of the correct answer.

At 208, two or more non-intersecting questions are provided to the authentication process, along with the correct answer and a set of distractors so that the question and answers may be presented as a multiple-choice question. If the user selects the correct answer to two or more such multiple-choice questions in different dimensions, it can be inferred that the user is likely authentically the person they are claiming to be. In a further example, the number of questions asked may be selected based on the degree of authentication desired, such that correctly answering more questions improves the probability that the user is authentically who they claim to be.

In other examples, the authentication questions may take other forms such as a free response question where the user is able to type an answer. Determination of correctness of an answer may comprise searching for certain keywords that are a part of the correct answer, searching for words related to certain keywords, using artificial intelligence such as a large language model to determine whether the provided answer is correct, of other such methods. In other examples, other types of questions may be presented such as simple yes/no questions or other question and answer formats that may achieve a similar authentication result. In further examples, authentication questions are used only once and are not reused.

FIG. 3 is a flow diagram of a multidimensional large language model user authentication process, consistent with an example embodiment. Data regarding user activity is collected across multiple dimensions at 302, such as by using a smartphone to collect a user's geographic location, movement, media use, purchase history, social media engagement, calendar events, electronic messaging, and the like. In further examples, other dimensions of user activity such as credit card records, IoT device access, and other external systems or devices may be authorized to similarly provide additional dimensions of user activity.

At 304, two or more user authentication questions are derived from the two or more dimensions of user activity using a large language model, such as a generative pre-trained transformer trained on the dimensions of activity available, a recurrent neural network or other neural network, or another such large language model. The questions in a further example are derived across multiple dimensions of user activity such that at least two questions are from different dimensions. Questions having intersecting dimensionality are discarded at 306, such as questions that are related to one another or that may help a malicious user infer the correct answer by knowledge of the user's activity in another dimension. In a mote detailed example, questions having intersecting time and/or location are discarded, such as where two questions relating to the same time or location may contain overlapping subject matter that allows inference of the answer to at least one of the intersecting questions. In one such example, questions like "where did the user travel at 12:05?" and "what did the user purchase at the grocery store at 12:05" intersect in time and location, and may result in at least one of the two questions being discarded because the answer to one of the questions may be inferred from the other intersecting question due to the intersecting time and location of the questions.

Two or more remaining non-intersecting questions from different dimensions are presented to the user at 308, such as in a multiple-choice format, a free response format, a yes/no format, or another suitable format to determine the user's knowledge of the collected user activity. Answers to the questions are received at 310, and the user's answers are compared to the known correct answers for the questions at 312 to authenticate the user. In a further example, the number of questions asked may be based on factors such as the type of question asked and the probability of a user randomly providing or guessing a correct answer, the degree of certainty desired for authentication, the number of dimensions of questions available, and other such factors.

The examples presented herein demonstrate how user of multidimensional large language model user authentication questions can be used to authenticate a user, even where a malicious user may have access to one dimension or an incomplete number of dimensions of user activity represented by the large language model-generated questions. This helps authenticate users in cases where at least some user data may have been compromised, such as where a user's bank account records have been stolen, a user has a GPS tracker on their car, a user's email or text messages have been compromised, and the like.

Improved user authentication may be especially useful in sensitive authentication applications such as user login to financial accounts, logging in to websites or services requiring two-factor authentication, performing a user password change, or other such applications. Multidimensional large language model user authentication third-party authentication may be provided as a third-party service in some examples, such as where a service provider like a bank or a store would like to use such authentication but do not desire to build such a system themselves.

Figure 4:
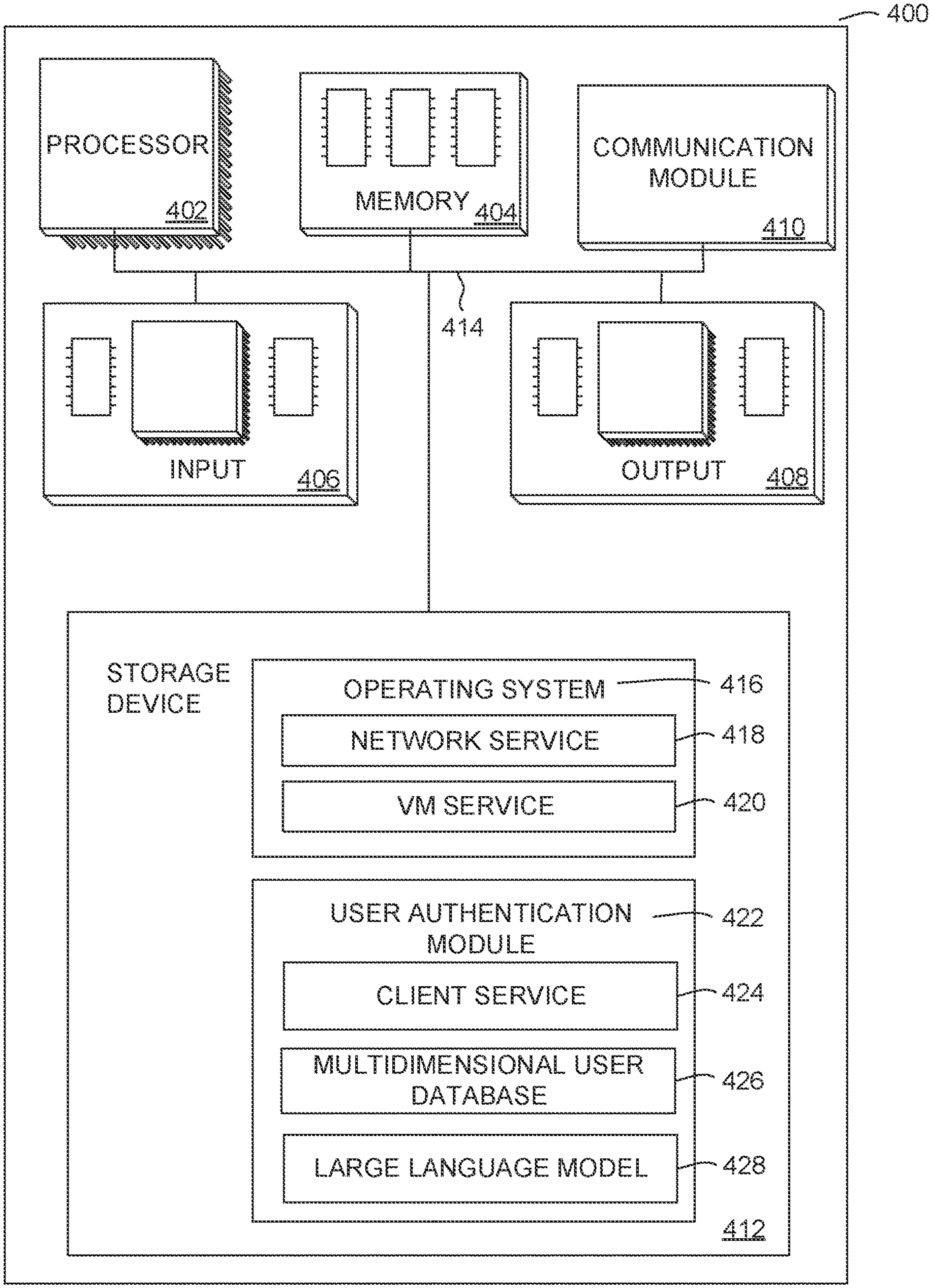
FIG. 4 is a computerized system employing multidimensional large language model user authentication, consistent with an example embodiment.

FIG. 4 is a computerized system, such as a user device, employing multidimensional local large language model user authentication, consistent with an example embodiment in which the LLM resides on the user device. FIG. 4 illustrates only one particular example of computing device 400, and other computing devices 400 may be used in other embodiments. Although computing device 400 is shown as a standalone computing device, preferably a user device, computing device 400 may be any component or system that includes one or more processors or another suitable computing environment for executing software instructions in other examples, and need not include all of the elements shown here.

As shown in the specific example of FIG. 4, computing device 400 includes one or more processors 402, memory 404, one or more input devices 406, one or more output devices 408, one or more communication modules 410, and one or more storage devices 412. Computing device 400 in one example further includes an operating system 416 executable by computing device 400. The operating system includes in various examples services such as a network service 418 and a virtual machine service 420 such as a virtual server. One or more applications, such as user authentication module 422 are also stored on storage device 412, and are executable by computing device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as user authentication module 422 and operating system 416 may also communicate information with one another as well as with other components in computing device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within computing device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when computing device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on computing device 400 such as user authentication module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 400 uses communication module 410 to communicate with an external device such as via public network 122 of FIG. 1.

Computing device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Computing device 400 may include operating system 416. Operating system 416, in some examples, controls the operation of components of computing device 400, and provides an interface from various applications such as user authentication module 422 to components of computing device 400. For example, operating system 416, in one example, facilitates the communication of various applications such as user authentication module 422 with processors 402, communication module 410, storage device 412, input device 406, and output device 408. Applications such as user authentication module 422 may include program instructions and/or data that are executable by computing device 400. As one example, user authentication module 422 uses client service 424 to receive authentication requests, and derives authentication questions in response using multidimensional user database 426 and large language model 428. These and other program instructions or modules may include instructions that cause computing device 400 to perform one or more of the other operations and actions described in the examples presented herein.

Although specific embodiments have been illustrated and described herein, any arrangement that achieves the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of authenticating a user in a computerized system, comprising:

collecting user data from a plurality of dimensions of user activity into a local large language model residing entirely on a user device;

generating a plurality of user authentication questions from two or more of the plurality of dimensions of user activity using the local large language model, wherein generated questions having intersecting times or locations are discarded prior to presentation and wherein, for each authentication question at least one plausible distractor answer is generated by the local large language model;

presenting the plurality of user authentication questions from two or more dimensions to the user;

receiving a user response to each of the plurality of user authentication questions;

comparing the user response to each of the plurality of user authentication questions to a known correct answer to each of the plurality of user authentication questions; and selectively authenticating the user based on the comparison between the user response and correct answer to each of the plurality of user authentication questions being correct.

2. The method of authenticating a user in a computerized system of claim 1, wherein collecting user data comprises collecting user activity via a smartphone.

3. The method of authenticating a user in a computerized system of claim 1, wherein the large language model comprises one or more of a neural network, a recurrent neural network, or a generative pre-trained transformer.

4. The method of authenticating a user in a computerized system of claim 1, wherein the plurality of dimensions comprise one or more of geographic location, purchase history, social media engagement, calendar events, electronic messaging, app usage, and media history.

5. The method of authenticating a user in a computerized system of claim 1, wherein the plurality of user authentication questions from two or more of the plurality of dimensions comprise authentication questions that do not intersect.

6. The method of authenticating a user in a computerized system of claim 1, wherein at least one of the plurality of user authentication questions comprises a multiple choice question and receiving a response comprises selecting the correct answer from among multiple presented answers.

7. The method of authenticating a user in a computerized system of claim 1, wherein receiving a response comprises receiving a typed text response.

8. The method of authenticating a user in a computerized system of claim 1, wherein the plurality of user authentication questions are used only once, and are not reused.

9. The method of authenticating a user in a computerized system of claim 1, wherein selectively authenticating the user comprises a part of at least one of user login, user two-factor authentication, user password change, or third-party authentication.

10. The method of authenticating a user in a computerized system of claim 1, wherein the large language model is trained using the plurality of dimensions of user activity.

11. The method of authenticating a user in a computerized system of claim 1, wherein at least one of: generating a plurality of user authentication questions, presenting the plurality of user authentication questions to the user, receiving a user response to each of the plurality of user authentication questions, comparing the user response to each of the plurality of user authentication questions to a known correct answer, and selectively authenticating the user, are performed in a server remote to the user.

12. A computing device, comprising:

a processor and a non-volatile storage, the non-volatile storage comprising instructions that when executed on the computing device cause the computing device to:

collect user data from a plurality of dimensions of user activity into a local large language model contained entirely on a user device;

generate a plurality of user authentication questions from two or more of the plurality of dimensions of user activity using the local large language model, wherein generated questions having intersecting times or locations are discarded prior to presentation and wherein, for each authentication question at least one plausible distractor answer is generated by the local large language model;

present the plurality of user authentication questions from two or more dimensions to a user;

receive a user response to each of the plurality of user authentication questions;

compare the user response to each of the plurality of user authentication questions to a known correct answer to each of the plurality of user authentication questions; and selectively authenticate the user based on the comparison between the user response and correct answer to each of the plurality of user authentication questions being correct.

13. The computing device of claim 12, wherein collecting user data comprises collecting user activity via a smartphone.

14. The computing device of claim 12, wherein the large language model comprises one or more of a neural network, a recurrent neural network, or a generative pre-trained transformer.

15. The computing device of claim 12, wherein the plurality of dimensions comprise one or more of geographic location, purchase history, social media engagement, calendar events, electronic messaging, app usage, and media history.

16. The computing device of claim 12, wherein the plurality of user authentication questions from two or more of the plurality of dimensions comprise authentication questions that do not intersect.

17. The computing device of claim 12, wherein receiving a response comprises at least one of selecting the correct answer from among multiple presented answers and receiving a typed text response.

18. The computing device of claim 12, wherein the large language model is trained using the plurality of dimensions of user activity.

19. The computing device of claim 12, wherein at least one of: generating a plurality of user authentication questions, presenting the plurality of user authentication questions to the user, receiving a user response to each of the plurality of user authentication questions, comparing the user response to each of the plurality of user authentication questions to a known correct answer, and selectively authenticating the user, are performed in a server remote to the user.

20. A method of authenticating a user in a computerized server, comprising:

collecting user data from a user device representing a plurality of dimensions of user activity into a large language model residing entirely on a user device;

generating a plurality of user authentication questions from two or more of the plurality of dimensions of user activity using the large language model, wherein generated questions having intersecting times or locations with are discarded prior to presentation and wherein, for each authentication question at least one plausible distractor answer is generated by the local large language model;

providing the plurality of user authentication questions from two or more dimensions to the user device for presentation to the user;

receiving a user response to each of the plurality of user authentication questions via the user device;

comparing the user response to each of the plurality of user authentication questions to a known correct answer to each of the plurality of user authentication questions in at least one of the computerized server and the user device; and selectively authenticating the user based on the comparison between the user response and correct answer to each of the plurality of user authentication questions being correct.

* * * * *